United States Patent [19]

Ehni

[11] Patent Number: 4,890,811

[45] Date of Patent: Jan. 2, 1990

[54] OUTBOARD MOTOR MOUNTING MEANS FOR BOATS

[76] Inventor: Scott M. Ehni, 8500 Lenore, Houston, Tex. 77017

[21] Appl. No.: 289,029

[22] Filed: Dec. 23, 1988

Related U.S. Application Data

[63] Continuation-in-part of Ser. No. 98,922, Sep. 21, 1987, abandoned, which is a continuation-in-part of Ser. No. 198,687, May 20, 1988, abandoned.

[51] Int. Cl.[4] ........................ B63H 21/26; F16M 1/00

[52] U.S. Cl. .................................... 248/642; 248/641; 440/61

[58] Field of Search ................................ 248/640–643; 182/127, 90–93; 440/61, 900

[56] References Cited

U.S. PATENT DOCUMENTS 1,141,196 6/1915 McLaren .
2,886,462 5/1959 Jagiel .
3,075,490 1/1963 Lang .
3,096,959 7/1963 Wagner .
3,245,641 4/1966 Hart .
3,567,164 3/1971 Pakala .
3,670,847 6/1972 Mack, Jr. .
3,809,343 5/1974 Adams et al. .
3,863,592 2/1975 Borst .
3,990,660 11/1976 Pipoz .
4,013,249 3/1977 Meyer et al. .
4,025,010 5/1977 Soot .
4,354,847 10/1982 Blanchard .
4,384,856 5/1983 Hall et al. .
4,448,387 5/1984 Gilbreath .
4,449,945 5/1984 Ferguson .
4,482,330 11/1984 Cook .
4,545,559 10/1985 Gilbreath .
4,669,698 6/1987 McGuire .
4,778,417 10/1988 Mixon, Jr. .

*Primary Examiner*—Alvin C. Chin-Shue
*Attorney, Agent, or Firm*—Dodge Bush & Moseley

[57] ABSTRACT

A mounting device (36) has a front bracket (38) mounted with a backing plate (84) on a boat transom (16) and a rear bracket (40) supports an outboard motor (18) thereon. Parallel links (64,70) are pivotally connected between the front and rear brackets (38,40) and a double acting hydraulic cylinder (76) raises and lowers the outboard motor (18). A plate (88,88C) is secured between the lower links (70) and has an inner end (116) mounted above the bottom (120) of the boat and slopes downwardly therefrom for deflecting water downwardly. A platform (92) is provided on the rear bracket (40) to support a swimmer or water skier. One embodiment (FIG. 8) mounts a pair of outboard motors (18A) on the boat transom (16A) for simultaneous raising and lowering.

10 Claims, 3 Drawing Sheets

FIG. 1
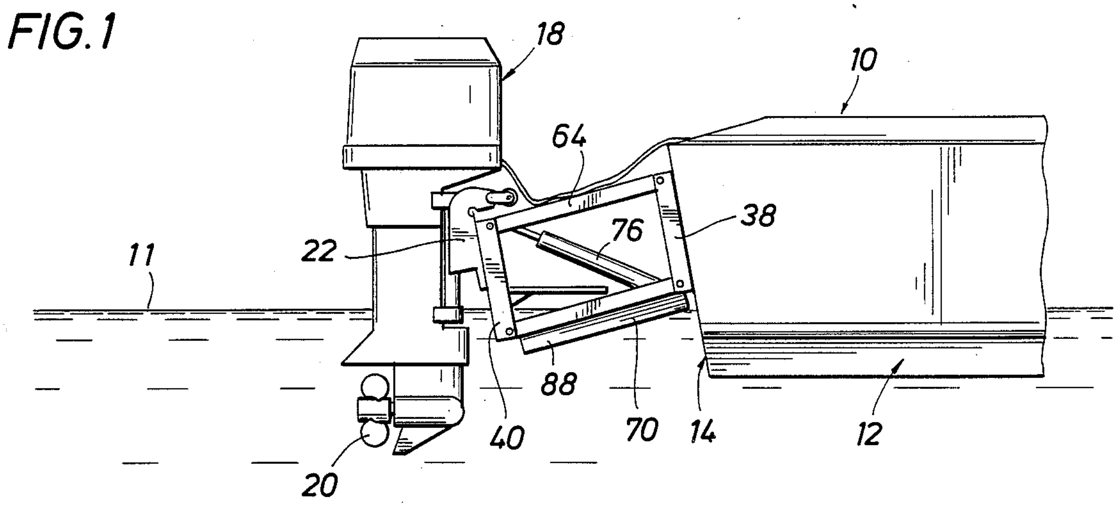
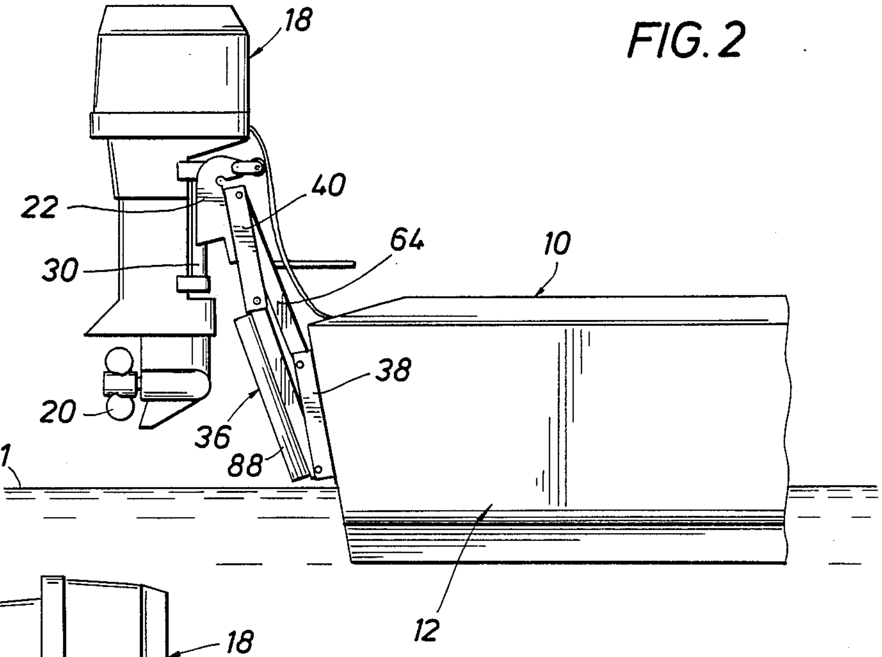
FIG. 2
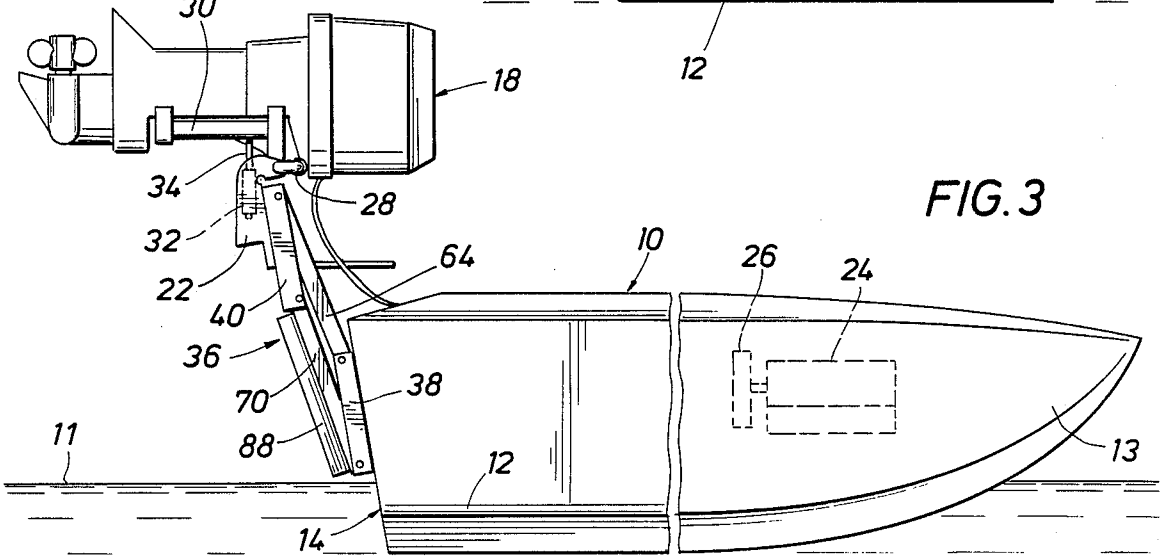
FIG. 3

FIG. 6
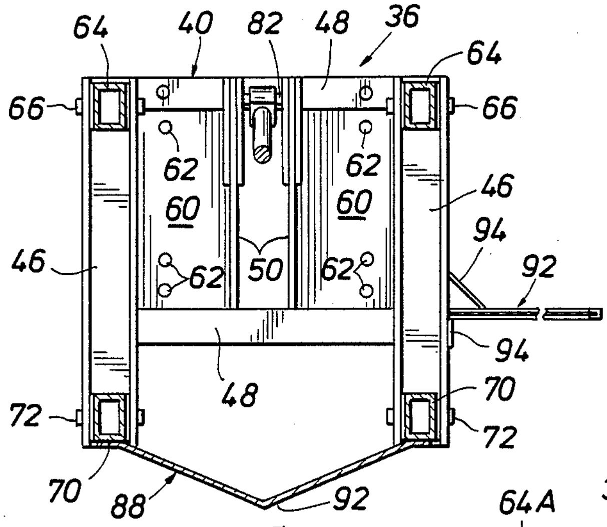
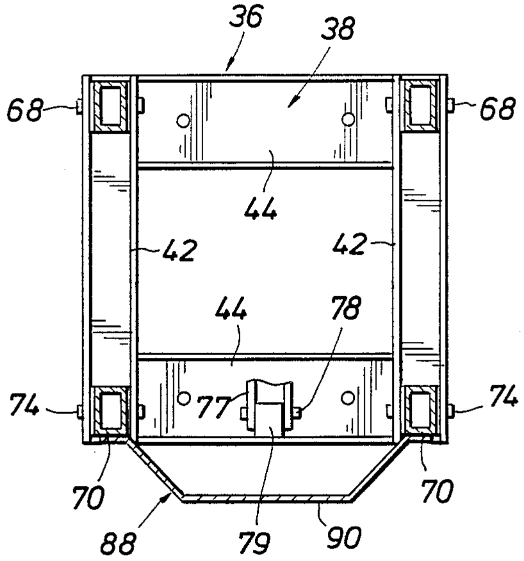
FIG. 7
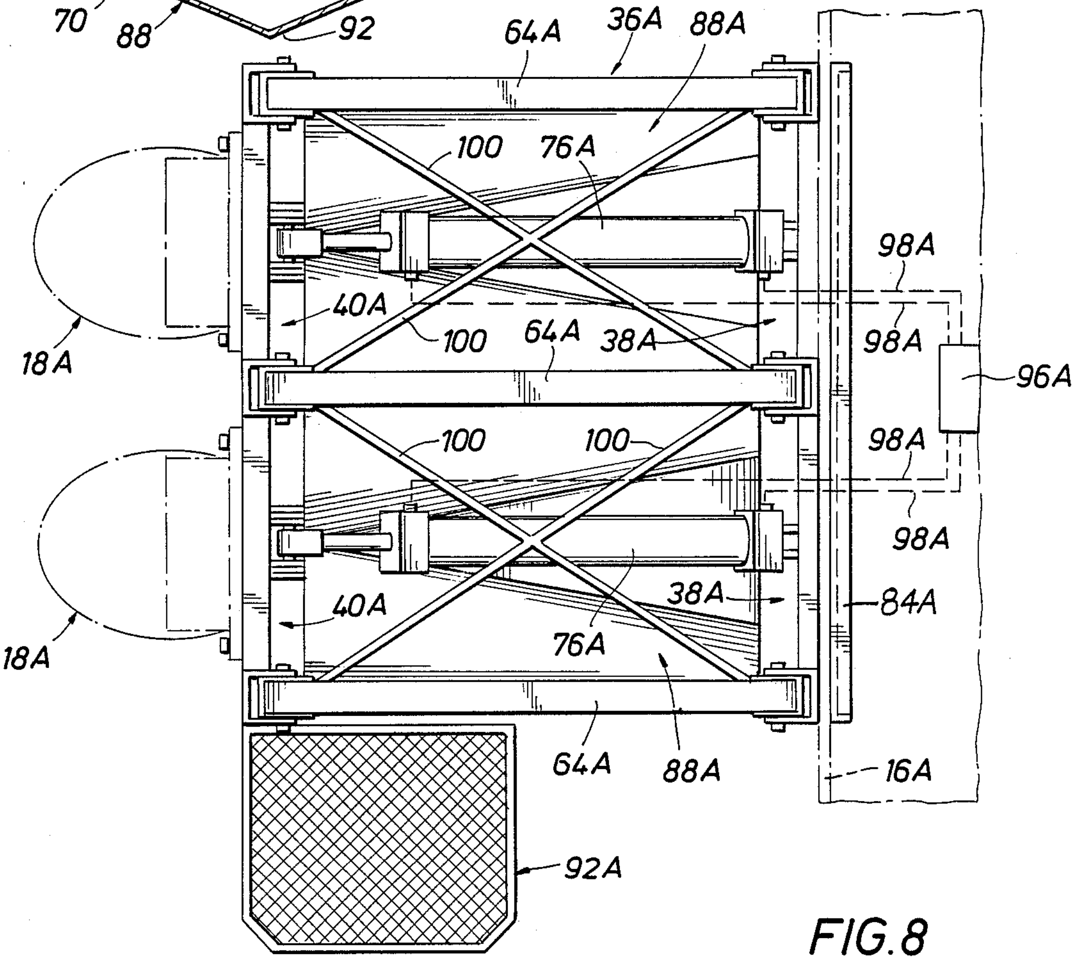
FIG. 8

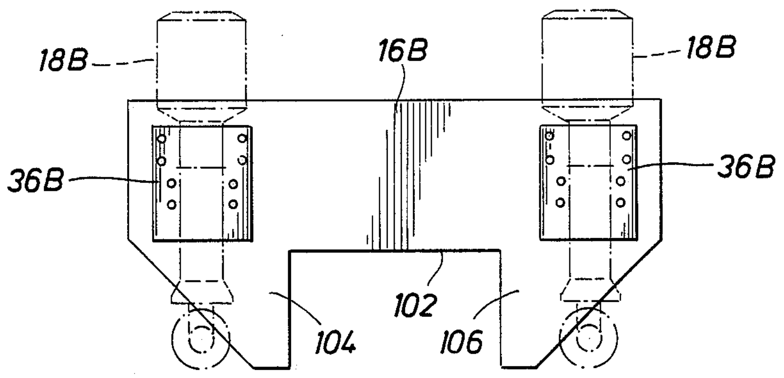
FIG. 9
FIG. 10
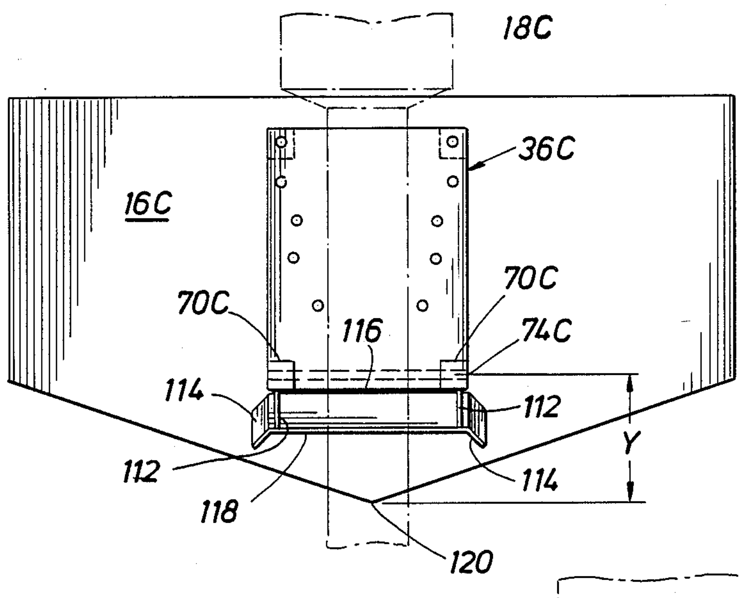
FIG. 11
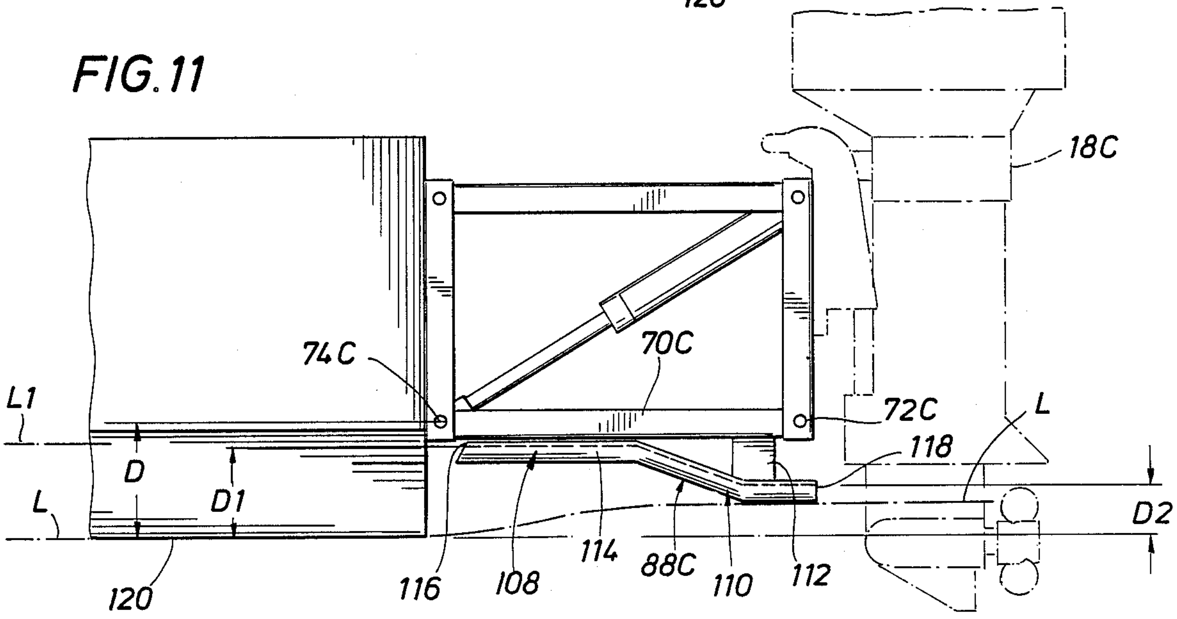

OUTBOARD MOTOR MOUNTING MEANS FOR BOATS

CROSS-REFERENCE TO RELATED APPLICATIONS

This application is a continuation-in-part of application Ser. No. 098,922 filed Sept. 21, 1987, now abandoned; and a continuation-in-part of application Ser. No. 196,687 filed May 20, 1988 now abandoned.

BACKGROUND OF THE INVENTION

This invention relates to outboard motor mounting means for boats and more particularly to such mounting means secured to the transom of a boat.

Heretofore, such is shown in U.S. Pat. No. 4,013,249, dated March 22, 1977, outboard motors have been mounted by separate mounting devices on a transom of a boat, such as the parallelogram linkage mounted between opposed brackets on the transom and the outboard motor. A hydraulic cylinder connected between the brackets moves the outboard motor up and down at a constant angle so that the motor maintains the same angular relationship with the transom of the boat throughout its travel. Such a parallelogram linkage supporting an outboard motor permits the support bracket to be secured to the outer surface of the transom or stern so that a full height transom may be utilized. When the outboard motor is raised to its uppermost position, such as might be desirable for storage or roadway transportation, the overall length of the boat and outboard motor is decreased. Also, in the event of fouling of the propeller on weeds, rope or the like, the propeller may be easily lifted from the water for removal of the fouling material. However, such mounting means or mounting devices for outboard motors do not include any means for assisting the boat in planing upon acceleration from a rest or stationary position in the water and in maintaining a desired ride angle during travel of the boat.

SUMMARY OF THE PRESENT INVENTION

The present invention is directed to mounting means for an outboard motor for attaching the outboard motor to the stern or transom of the boat and utilizing a parallelogram linkage between the outboard motor and transom. The mounting means is particularly adapted for use with outboard motors which are the primary propulsion for the boat and adapted for mounting large horsepower outboard motors as well as multiple outboard motors to the transom of the boat.

One feature of the mounting device is the use of a trim and deflector plate between the lower arms or links of the parallelogram linkage which is positioned to extend into the water when the motor is in its lowermost position for assisting the boat in planing upon initial acceleration by directing the stern of the boat upwardly for planing in a minimum of time upon acceleration from a rest position. Also, the plate deflects water downwardly to minimize the upward splashing of water from the stern of the boat about the motor.

Additional means mount the outboard motor on the parallelogram linkage for relative pivotal movement about a generally vertical axis for steering of the boat and for relative pivotal movement about a generally horizontal axis for tilting of the motor and propeller relative to the linkage. A control console at the helm of the boat permits an operator to position the linkage and the motor as desired through suitable fluid cylinders or the like.

Since the outboard motor is supported in a cantilevered relation from the transom, a substantial torque force is provided particularly from relatively large outboard motors such as a two hundred and seventy-five horsepower (275 HP) motor, for example, which may extend two or three feet from the transom. A backing support plate is positioned on the inside of the transom in horizontal alignment with the securing bracket for the parallelogram linkage for receiving and securing the mounting bolts.

It is an object of this invention to provide a mounting device for an outboard motor on the transom of a boat and utilizing a parallelogram linkage for raising and lowering the outboard motor.

It is a further object of the invention to provide such a mounting device in which a trim and deflector plate is mounted between the lower pair of links and slopes downwardly from the stern of the boat to deflect water downwardly during planing of the boat and to assist the boat in achieving a planing attitude.

An additional object of the invention is to provide such a mounting means for a pair of outboard motors mounted on a common linkage and raised and lowered in unison.

These and other objects and advantages of the invention will become more apparent from the following detailed description when taken in conjunction with the accompanying drawings.

BRIEF DESCRIPTION OF THE DRAWINGS

FIG. 1 is a side elevational view of the outboard motor mounting means secured to a transom of a boat illustrating the boat in an operating position prior to planing of the boat;

FIG. 2 is a view similar to FIG. 1 but showing the outboard motor in a raised position and the boat in a stationery or rest position in the water;

FIG. 3 is a view similar to FIG. 2 but showing the outboard motor tilted upwardly relative to the linkage and the boat;

FIG. 6 is a section view taken generally along line 6—6 of FIG. 5 and showing the bracket for supporting the outboard motor thereon with the lower trim plate shown in section;

FIG. 7 is a section view taken generally along line 7—7 of FIG. 5 and showing the bracket for mounting on the transom of the boat;

FIG. 8 is a modification of the outboard motor mounting means in which a modified parallelogram linkage is illustrated for mounting a pair of outboard motors to the transom of a boat;

FIG. 9 is a further modification illustrating an outboard motor mounting means in accordance with this invention mounted on each side of the transom of a catamaran;

FIG. 10 is a rear elevation of an outboard motor mounting means in accordance with this invention utilizing a modified trim and deflector plate mounted between a pair of lower links of the parallelogram linkage; and FIG. 11 is a side elevation of the mounting means of FIG. 10 showing the modified trim and deflector plate sloping downwardly from the transom of the boat.

BRIEF DESCRIPTION OF THE INVENTION

Figure 5:
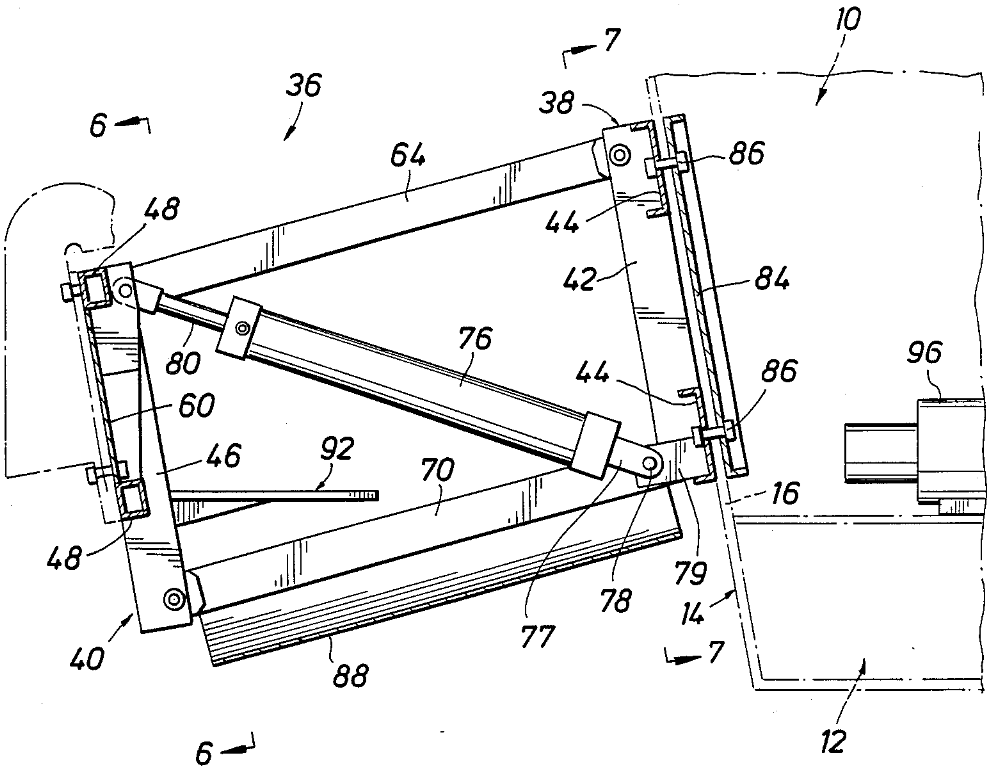
FIG. 5 is a section view taken generally along line 5—5 of FIG. 4 and showing the parallelogram linkage in an operable position.

Referring to the drawings for a better understanding of the invention, and more particularly to the embodiment shown in FIGS. 1–7, a boat is generally indicated at 10 within a body of water forming surface 11. Boat 10 has a hull or body generally indicated at 12 with a bow 13 and a stern 14 having a transom 16. An outboard motor is shown generally at 18 and may be of a selected make and horsepower as desired. Outboard motor 18 includes a propeller 20 and a mounting bracket shown generally at 22 for mounting outboard motor 18 on a suitable support structure as desired. As shown particularly in FIG. 3, a control console is shown generally at 24 including a steering wheel 26 for pivoting motor 18 about axis 30 for steering. Also, a hydraulic motor and associated hydraulic cylinder illustrated generally at 32 are provided on outboard motor 18 for tilting of motor 18 relative to bracket 22 from suitable controls on console 24, as well known in the art.

For raising and lowering outboard motor 18 and forming an important part of this invention, a mounting device is shown generally at 36 positioned between boat 10 and outboard motor 18. Mounting device 36 includes a parallelogram linkage having a front bracket shown generally at 38 in FIG. 7 for securement to transom 16 of boat 10, and a rear bracket 40 as shown in FIG. 6 on which outboard motor 18 is secured from bracket 22.

Front bracket 38 includes a pair of generally vertically extending spaced channels 42 and a pair of generally horizontal channels 44 extending between and secured to vertical channels 42 particularly as shown in FIG. 7. Rear bracket 40 includes a pair of vertically extending channels 46 having horizontal cross members 48 extending therebetween. A pair of spaced vertical stiffeners 50 extend between and are secured to horizontal cross members 48, and plates 60 extend between channels 46 and vertical stiffners 50. Suitable openings shown at 62 on FIG. 6 are provided on rear bracket 40 in a predetermined pattern for connection of bracket 22 of outboard motor 18 thereto as will be explained further.

A pair of upper parallel links or arms 64 extend between and are pivotally connected at 66 adjacent one end to channels 46 of rear bracket 40 and pivotally connected at 68 adjacent opposed ends to channels 42 of front bracket 38. A pair of lower parallel links or arms 70 are pivotally connected at 72 adjacent one end to channels 46 of outer bracket 40 and pivotally connected at 74 adjacent opposed ends to channels 42 of front bracket 38.

For raising and lowering the parallelogram linkage 36 and outboard motor 18 mounted thereon relative to boat 10, a hydraulic cylinder 76 has a clevis 77 pivotally mounted at 78 to a support 79 secured to lower channel 44 of front bracket 38 at a position at least around six (6) inches above the bottom of the boat. An extending piston rod 80 is pivotally mounted about a pin 82 secured between vertical stiffeners 50 of rear bracket 40.

Figure 4:
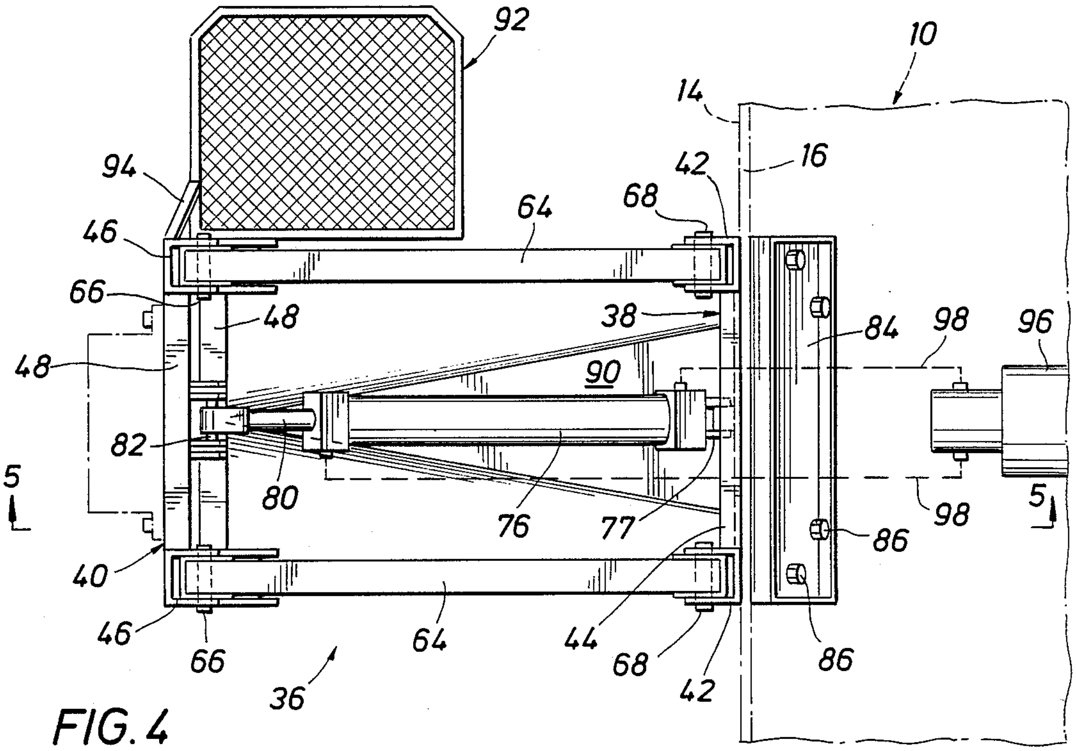
FIG. 4 is a top plan of the mounting means for the motor shown in FIG. 1 showing the parallelogram linkage secured to the boat transom and backing plate.

For mounting front bracket 38 on transom 16, and referring paticularly to FIGS. 4 and 5, a backing plate 84 is positioned in contact with the inner surface of transom 16 and in generally horizontal alignment with front bracket 38. A plurality of aligned openings are provided in plate 84 and channels 44 to receive suitable bolt and nut combinations 86 for securing parallelogram linkage 36 to transom 16. Since linkage 36 is mounted in a cantilevered fashion or manner on transom 16, a substantial torque force is exerted by outboard motor 18 particularly when linkage 36 is fully extended from transom 16.

Mounted between lower arms 70 and forming an imporant feature of this invention is a trim and deflector plate generally indicated at 88 secured along its outer marginal side portions to lower arms 70 such as by welding. Trim and deflector plate 88 as shown in the drawings includes a generally V-shaped center portion 90 which tapers from front bracket 38 particularly as shown in FIG. 4 to V-shaped end 92 adjacent rear bracket 40 as shown in FIG. 6. Plate 88 may be of various shapes depending on the hull of the boat on which it is mounted and is positioned on lower links 70 so that its front end portion is above the lower surface of the boat and at least its rear end portion is immersed in the water when the boat is in a stationery or rest position as shown in FIGS. 1 and 5. Thus, upon acceleration from a rest position during which the bow of the boat tends to rise, water contacting the lower surface of plate 88 tends to raise stern 14 of boat 10 thereby effecting a lowering of bow 13 to permit boat 10 to achieve a planing attitude earlier than heretofore. Additionally, plate 88 slopes downwardly from transom 14 in both a non-planing and planing position of the boat and deflects downwardly splashing water striking the lower surface of the plate. Further, after a planing attitude is achieved, plate 88 may be lowered or raised as desired to provide a desired boat ride angle as may be adjusted for various loading conditions and weight of fuel, for example. In addition, plate 88 reinforces lower links or arms 70 and parallelogram linkage 36.

Mounted on a side of parallelogram linkage 36 to channel 46 of rear bracket 40 is a generally horizontal platform shown generally at 92 in FIG. 4 to support a swimmer or water skier, for example. Platform 92 may be welded to suitable bracing members 94 secured to channel 46.

As indicated above, outboard motor 18 is a conventional type motor which is normally mounted directly to the transom of a boat and is of a selected design and horsepower, as desired. Rear bracket 22 which is a part of motor 18 is normally formed with an industry accepted bolt hole design for mounting outboard motor 18 ona transom of a boat. Rear bracke 40 is likewise provided with the industry accepted bolt hole design and suitable fasteners secure mounting bracket 22 thereon. Outboard motor 18 is controlled from console 24 and is steered and tilted as desired.

For providing hydraulic fluid to double acting hydraulic cylinder 76 to raise and lower linkage 36, a hydraulic pump shown at 96 is mounted within boat 10 adjacent transom 16 and has suitable fluid lines indicated schematically at 98 extending to hydraulic cylinder 76. Suitable manual controls at console panel 24 control the actuation of hydraulic pump 96.

In operation, with motor 18 and linkage 36 raised to an uppermost position as shown in FIG. 2 for storage or roadway transportation, propeller 20 is raised a substantial distance above the bottom of boat 10 and is positioned closely adjacent transom 14 to provide minimum length of the boat and trailer for storage. When boat 10 is placed within the water, outboard motor 18 is loweed upon actuation of cylinder 76 to extended position as shown in FIG. 1 with plate 88 at least partially immersed in the water. Upon acceleration of boat 10 from a rest or stationary position, the bow of boat 10 tends to rise. However, water contacting plate 88 tends to raise the stern of the boat, thereby to achieve a planing attitude in minimal time. The desired boat ride angle may be adjusted thereafter by raising or lowering parallelogram linkage 36. Also, when boat 10 is in relatively shallow water, the outboard motor 18 may be raised so that propeller 20 is above the lower surface of the boat.

Referring now to FIG. 8, a modified parallelogram linkage 36A is illustrated for mounting a pair of outboard motors 18A. Three upper arms 64A and three lower arms 70A are provided between a pair of front brackets 38A secured to transom 16A and backing plate 84A, and a pair of rear brackets 40A each having a motor 18A mounted thereon. A pair of hydraulic cylinders 76A are provided and suitable hydraulic lines 98A extend to hydraulic pump 96A for control thereof. To reinforce upper arms 64A a pair of braces 100 extend diagonally between adjacent arms 64A. The operation of linkage 36A is similar to that of linkage 36.

Thus, the pair of motors 18A are raised and lowered simultaneously by linkage 36A. Plates 88A secured between lower arms 70A are raised and lowered simultaneously with linkage 36A thereby to provide a uniform simultaneous movement of plates 88A. Cross braces 100 extend between opposite ends of adjacent upper arms 64A for reinforcing arms 64A. If desired, similar reinforcing braces could be provided for the embodiment of FIGS. 1–6.

Referring to FIG. 9, a transom 16B for a catamaran has a well 102 between a pair of hulls 104 and 106. Mounted on each hull 104 and 106 is a mounting device 36B similar to mounting device 36 of the embodiment shown in FIG. 1–7. Each mounting device 36B has an outboard motor 18B mounted thereon for movement in a manner similar to motor 18.

Referring now to FIGS. 10 and 11, a modified mounting device 36C on transom 16C is shown utilizing an improved trim and deflector plate 88C. Plate 88C is secured between the pair of lower links 70C which are pivotally mounted at 72C and 74C. Plate 88C has a forward end portion 108 welded to links 70C and a rearward end portion 110 sloping downwardly from end portion 108 and secured to spacers 112 extending to and secured to links 70C. The sides of plate 88C are flared downwardly to form side flanges 114 extending betwen inner end 116 and outer end 118 of plate 88C. Pivot 74C of links 70C is positioned on transom 16C at a distance D above the bottom 120 of the boat at least around six (6) inches from bottom 120. Forward end 116 of plate 88C is spaced a distance D1 at least around four (4) inches from bottom 120 in order to provide an air pocket with adequate space for the splashing water and cavitation generated particularly during planing of the boat.

While rear end 118 of plate 88C is normally immersed in water at a rest or non-planing position, rear end 118 is normally spaced from the bottom 120 of the boat a distance D2 around at least two (2) inches and is usually spaced from the upper surface of the water after planing is achieved as indicated by water level L in FIG. 11. A high pressure area is provided beneath rear end 118 and as a result water tends to be displaced outwardly of motor 18C. The level of the water in a rest or non-planing position is shown at L1. Plate 88C slopes downwardly from front end 116 to rear end 118 and water moving upwardly form the bottom 120 of the boat strikes the bottom surface of plate 88C to deflect the water downwardly away from motor 18C and to aid, particularly when the boat is moving rom a non-planing position to a planing position, in lifting the rear end of the boat for planing. Since plate 88C is normally above the water level during planing, plate 88C does not exert a drag on the boat in the planing attitude.

It is to be understood that plate 88C may be utilized with the embodiment of the invention shown in FIGS. 1–7 and the embodiment shown in FIG. 8 in which a parallelogram linkage is provided for mounting a pair of outboard motors.

From the above, it is apparent that several advantages are obtained by the improved means for mounting outboard motors on a boat transom including the extension or retraction of the outboard motor relative to the boat as may be desired for various purposes such as storage or roadway tansportation, the early planing of the boat and the maintenance of a desired ride angle, the raising of the propeller in shallow water to a location around the same level as the bottom of the boat, and the mounting of a pair of outboard motors on a single parallelogram linkage for simultaneous movement. Also, the plate mounted on the pair of lower links above the bottom of the boat and sloping downwardly from the transom deflects water away form the motor and aids the boat in achieving a planing attitude.

While preferred embodiments for the present invention have been illustrated in detail, it is apparent that modifications or adaptations of the preferred embodiments will occur to those skilled in the art, and it is to be expressly understood that such modifications or adaptations are in the spirit and scope of the present invention as set forth in the following claims.

What is claimed is:

1. In a power boat having a transom and adapted to be powered from an outboard motor; an improved mounting device for mounting the outboard motor on the transom comprising:

a linkage having a front support bracket mounted on the outer surface of the transom above the bottom of the boat and a rear support bracket on which the outboard motor is mounted, and upper and lower pairs of generally parallel links extending between and pivotally connected to said front and rear bracktes;

a plate secured to said pair of lower links for movement therewith having a front end adjacent the transom of the boat and a rear end adjacent the outboard motor, said front end of said plate being positioned above the bottom of the boat with said plate sloping downwardly from said front end to said rear end during operation of the boat in both non-planing and planing attitudes of the boat, the spacing of said forward end of said plate above the bottom of the boat forming a space adjacent the transom duing planing of the boat to receive splashing water with said plate deflecting such water downwardly, said plate having a forward end portion thereof mounted on said pair of lower links and a rear end portion spaced downwardly from said pair of lower links, and means extending between said lower links and said rear end portion for mounting said rear end portion on said lower links at a distance spaced greater than the mounting of the forward end portion to said pair of lower links; and power means connected to said linkage to raise and lower said linkage and associated plate relative to said transom.

2. In a power boat as set forth in claim 1;

a backing plate mounted on the inner surface of the transom in substantially horizontal alignment with said front support bracket;

and suitable fasteners extending through said front bracket, said transom, and said backing plate for mounting said parallelogram linkage on said transom.

3. In a power boat as set forth in claim 1;

a platform mounted on the side of said parallelogram linkage to support a load thereon.

4. In a power boat as set forth in claim 1;

said parallelogram linkage including three parallel upper links and three parallel lower links adapted to support a pair of motors thereon; and a plate extends between each adjacent pair of said parallel lower links.

5. In a power boat having a transom and adapted to be powered from an outboard motor spaced a substantial distance rearwardly from the transom;

a parallelogram linkage extending between the transom and outboard moor including a front bracket mounted on the outer surface of the transom, a rear bracket on which the outboard motor is mounted, a pair of parallel upper links extending between and pivotally connected to said brackets, and a pair of parallel lower links extending between and pivotally connected to said brackets;

a backing plate mounted on the inner surface of the tansom in substantialy horizontal aignment with said front bracket;

a plurality of fastners extending through said front bracket, said transom, and said backing plate for securing said parallelogram linkage and outboard motor to said transom;

a plate secured to said pair of lower links for movement therewith having a front end adjacent the transom of the boat and a rear end adjacent the outboard motor, said front end of said plate being positioned a distance at least around six (6) inches above the bottom of the boat with said plate sloping downwardly from said front end to said rear end during operation of the boat in both non-planing and planing attitudes of the boat, the spacing of said forward end of said plate above the bottom of the boat forming a space adjacent the transom during planing of the boat to receive splashing water with aid plate deflecting such splashing water downwardly, said plate having a forward end portion thereof mounted on said pair of lower links and a rear end portion spaced downwardly from said pair of lower links, and means extending between said lower links and said rear end portion for supporting said rear end portion at a distance spaced greater than the mounting of the forward end portion to said pair of lower links; and fluid power means connected to said parallelogram linkage to raise and lower said linkage and outboard motor relative to said transom.

6. In a power boat as set forth in claim 5;

said fluid power means being a hydraulic cylinder; and a hydraulic fluid pump is mounted in said boat adjacent said transom for supplying fluid to said fluid power means.

7. In a power boat as set forth in claim 6;

said hydraulic cylinder extending between said front and rear brackets at a location generally centrally of the width of said parallelogram linkage.

8. In a power boat having a transom and adapted to be powered from an outboard motor; an improved mounting device for mounting the outboard motor on the transom comprising:

a parallelogram linkage having a front support bracket mounted on the outer surface of the transom above the bottom of the boat and a rear support bracket on which the outboard motor is mounted, and upper and lower pairs of parallel links extending between and pivotally connected to said front and rear brackets;

a plate secured to said pair of lower links for movement therewith having a front end adjacent the transom of the boat and a rear end adjacent the outboard motor, said front end of said plate being positioned a distance at least around six (6) inches above the bottom of the boat with said plate sloping downwardly from said front end to said rear end during operation of the boat in both non-planing and planing attitudes of the boat, the spacing of said forward end of said plate above the bottom of the boat forming a space adjacent the transom during planing of the boat to receive splashing water with said plate deflecting such water downwardly, said plate having side marginal portions flared downwardly to define opposed side flanges for deflecting water downwardly; and power means connected to said parallelogram linkage to raise and lower said linkage and associated plate relative to said transom.

9. In a power boat having a transom and adapted to be powered from an outboard motor; an improved mounting device for mounting the outboard motor on the transom comprising:

a parallelogram linkgae having a front support bracket mounted on the outer surface of the transom above the bottom of the boat and a rear support bracket on which the outboard motor is mounted, and upper and lower pairs of parallel links extending between and pivotally connected to said front and rear brackets;

a plate secured to said pair of lower links for movement therewith having a front end adjacent the transom of the boat and a rear end adjacent the outboard motor, said front end of said plate being positioned a distance at least around six (6) inches above the bottom of the boat with said plate sloping downwardly from said front end to said rear end during operation of the boat in both non-planing and planing attitudes of the boat, the spacing of said forward end of said plate above the bottom of the boat forming a space adjacent the transom during planing of the boat to receive splashing water with said plate deflecting such water downwardly, said plate having a forward end portion thereof mounted directly to said pair of lower links and a rear end portion spaced downwardly from said pair of lower links, and reinforcing spacing members extending between said lower links and said rear end portion for mounting said rear end portion on said lower links at a distance spaced greater than the mounting of the forward end portion to said pair of lower links; and power means connected to said parallelogram linkage to raise and lower said linkage and associated plate relative to said transom.

10. In a power boat having a transom and adapted to be powered from an outboard motor; an improved mounting device for mounting the outboard motor on the transom comprising:

a parallelogram linkage having a front support bracket mounted on the outer surface of the transom and a rear support bracket on which the outboard motor is mounted, and upper and lower pairs of parallel links extending between and pivotally connected to said front and rear brackets;

a plate secured to said pair of lower links for movement therewith having a front end adjacent the transom of the boat and a rear end adjacent the outboard motor, said front end of said plate being positioned a distance at least around six (6) inches above the bottom of the boat with said plate sloping downwardly from said front end to said rear end during operation of the boat in both non-planing and planing attitudes of the boat, the spacing of said forward end of said plate above the bottom of the boat forming a space adjacent the transom during planing of the boat to receive splashing water with said plate deflecting such splashing water downwardly, said plate having a forward end portion thereof mounted directly to said pair of lower links and a rear end portion spaced downwardly from said pair of lower links, and reinforcing spacing members extending between said lower links and said rear end portion for mounting said rear end portion on said lower links at a distance spaced greater than the mounting of the forward end portion to said pair of lower links; and a double acting hydraulic cylinder connected to said parallelogram linkage to raise and lower said linkage and associated plate selectively relative to said transom and operable to permit said plate to be positioned at a predetermined height relative to the boat during movement of the boat along the water.

* * * * *